No. 848,162. PATENTED MAR. 26, 1907.
R. ENRIGHT.
UNIVERSAL JOINT FOR PIPES.
APPLICATION FILED JULY 16, 1906.
2 SHEETS—SHEET 1.
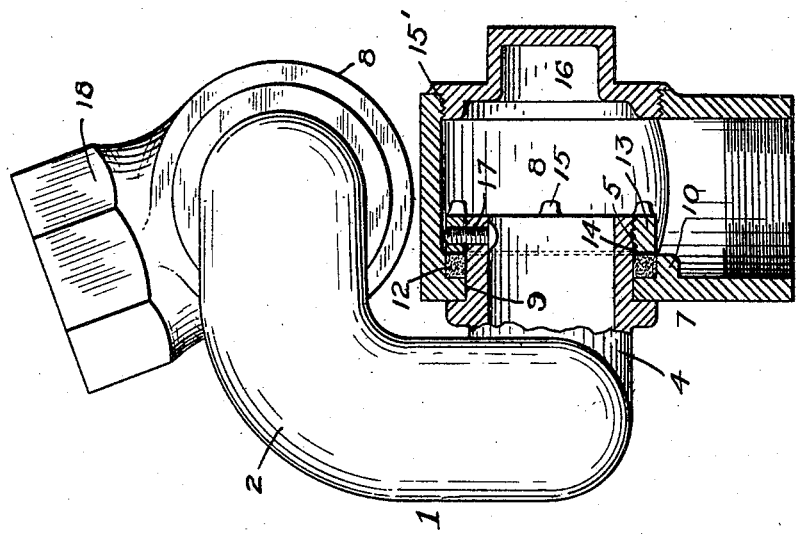
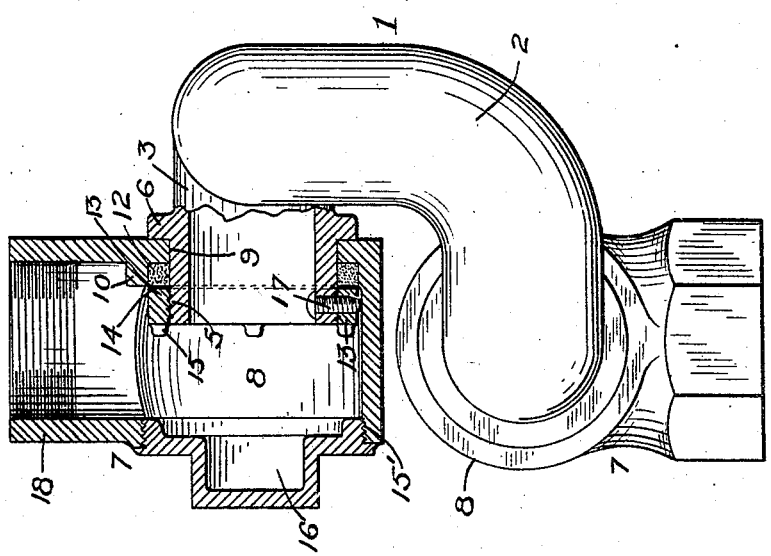
Witnesses
Charles Parker
C. H. Griesbauer
Inventor
R. Enright.
by H. B. Willson & Co
Attorneys No. 848,162. PATENTED MAR. 26, 1907.
R. ENRIGHT.
UNIVERSAL JOINT FOR PIPES.
APPLICATION FILED JULY 16, 1906.

2 SHEETS—SHEET 2.

Witnesses
Charles Parker
C. H. Griesbauer

Inventor
R. Enright.
by H. B. Willson & Co
Attorneys

UNITED STATES PATENT OFFICE.

ROGER ENRIGHT, OF LOS ANGELES, CALIFORNIA.

UNIVERSAL JOINT FOR PIPES.

No. 848,162.  Specification of Letters Patent.  Patented March 26, 1907.

Application filed July 16, 1906. Serial No. 326,490.

*To all whom it may concern:*

Be it known that I, ROGER ENRIGHT, a citizen of the United States, residing at Los Angeles, in the county of Los Angeles and State of California, have invented certain new and useful Improvements in Universal Joints for Pipes; and I do declare the following to be a full, clear, and exact description of the invention, such as will enable others skilled in the art to which it appertains to make and use the same.

This invention relates to improvements in universal joints for pipes.

The object of the invention is to provide a joint of this character by means of which pipes connected therewith may be swung in any direction.

A further object is to provide a universal joint and means whereby the internal pressure of the fluid in the pipes will be utilized to increase and preserve tightness of the joint, thereby preventing leakage.

With the above and other objects in view the invention consists of certain novel features of construction, combination, and arrangement of parts, as will be hereinafter described and claimed.

Figure 4:
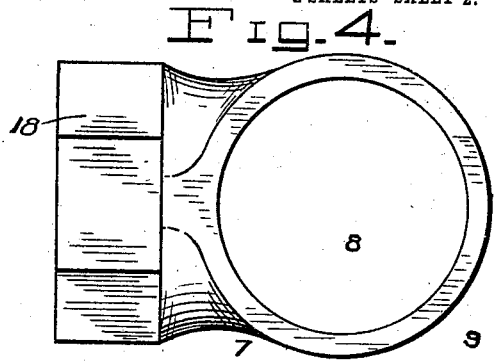
Figure 3:
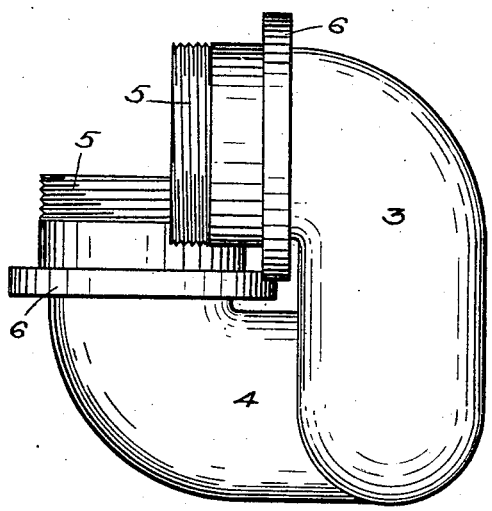
Figure 5:
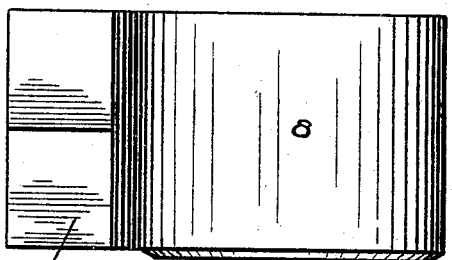
Figure 6:
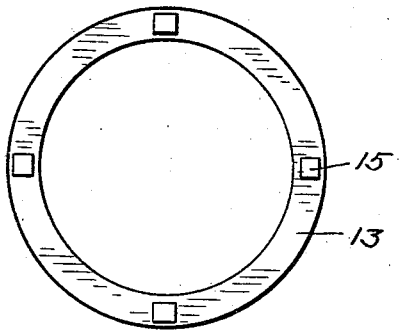
Figure 7:
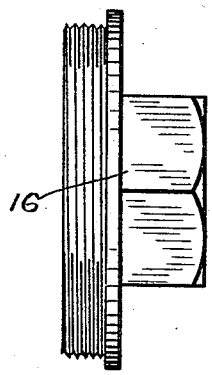

In the accompanying drawings, Figure 1 is a side view, partly in section, of a joint constructed in accordance with the invention. Fig. 2 is a similar view at right angles to Fig. 1. Fig. 3 is a top plan view of the body of the joint with the parts in the position shown in Fig. 1, the coupling or pipe connections being removed. Fig. 4 is a side view of one of the pipe connections. Fig. 5 is a similar view taken at right angles to Fig. 1. Fig. 6 is a plan view of one of the jam-rings, and Fig. 7 is a side view of one of the screw caps or plugs used in connection with the joint.

Referring more particularly to the drawings, 1 denotes the tubular main or body portion of the joint, which consists of a central curved portion 2 and upper and lower right-angularly-bent portions 3 and 4. The right-angularly-bent portions 3 and 4 are arranged in planes at right angles to each other and bent or curved so that the open ends of the same will project at right angles to their main portions and in vertical planes at right angles to each other, as clearly shown in Fig. 3 of the drawings.

The ends of the portions 3 and 4 are externally threaded, as at 5, and are provided at a suitable distance in from said threaded ends with annular stop-flanges 6. On the smooth portions of the ends, between the threads 5 and the stop-flanges 6, are revolubly mounted pipe connections or couplings 7, said connections or couplings preferably consisting of a cylindrical body portion 8, in one side of which is formed a circular opening 9, into which the ends of the sections 3 and 4 are inserted until said sides of the couplings engage the flanges 6 on said ends.

On the inner sides of the couplings 7, adjacent to the openings 5, are formed annular concentric inwardly-projecting flanges 10, between which and the ends of the sections 3 and 4 are arranged packing-rings 12. On the threaded ends of the portions 3 and 4, within the body portion 8 of the couplings 7, are adapted to be screwed jam-rings 13, between which and the packing-rings 12 is arranged a washer 14. The jam-rings 13 are provided with a series of lugs 15, by means of which said rings are engaged by a suitable tool to screw the same into tight engagement with the washer 14, thereby forcing the packing-rings 12 into tight engagement with their seats formed by the annular flange 10 in the body portion of the couplings 7.

In the side of the body portions 8 of the couplings 7, opposite to the openings 9, are formed threaded openings 15, which are adapted to be closed normally by means of screw plugs or caps 16, which are adapted to be removed to facilitate the arrangement of the packing and jam rings 12 and 13 on the inner ends of the sections 3 and 4, as hereinbefore described. After the jam-ring 13 has been screwed in place a set-screw 17 is screwed through alined passages formed in the ends of the portions 3 and 4 and in the jam-rings 13, thereby securely holding the jam-rings in place. The body portions 8 of the couplings 7 are provided on one edge with a lateral tubular projection 18, the outer end of which is threaded internally to receive the threaded end of the pipe to be connected thereto. Said tubular projection 18 is preferably provided with squared or flattened faces adjacent to their outer end, whereby the same may be held in a vise or wrench while the pipes are being screwed therein, as will be understood.

By means of a pipe-joint constructed as herein shown and described the pipes connected therewith may be run in a straight line or swung at any desired angle. In the construction and arrangement of the parts connecting the coupling heads or connections it will be noted that internal pressure of the fluid passing through the joints will have a tendency to compress the packing-rings 12, thereby preventing or decreasing the possibility of leakage at the points of connection between said parts.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention as defined by the appended claims.

Having thus described my invention, what I claim as new, and desire to secure by Letters Patent, is—

1. A pipe-joint comprising a main or body portion having at each end right-angularly-formed portions which project in planes at right angles to each other, said portions being bent or curved so that the outer ends thereof project in planes at right angles to said portions, coupling-heads or pipe connections arranged on said ends and means whereby said coupling-heads are connected to said ends to turn thereon in planes at right angles to each other, substantially as described.

2. A pipe-joint comprising a main or body portion having at each end right-angularly-formed portions which project in planes at right angles to each other, said portions being bent or curved so that the outer ends thereof project in planes at right angles to said portions, coupling-heads or pipe connections arranged on said ends, couplings comprising cylindrical body portions having formed in one side circular openings to receive the ends of said main or body portion, packing-rings arranged on said ends around the circular openings in said couplings and jam-rings adapted to be screwed onto the projecting ends of said body portion within the cylindrical body of the pipe-couplings, and means to facilitate the engagement of said parts, substantially as described.

3. A pipe-joint of the character described comprising a main or body portion having at each end right-angularly-formed portions, which project in planes at right angles to each other, said portions being bent or curved so that the outer ends thereof project in planes at right angles to said portions, exterior screw-threads formed on said right-angularly-bent ends, annular flanges formed on said ends at a suitable distance from said threads, coupling-heads arranged on said threaded ends, said heads comprising a cylindrical body portion having formed in one side a circular opening to receive said threaded ends of the main or body portion, a packing-ring seat on the inner side of said cylindrical body of the coupling adjacent to the opening therein, a packing-ring arranged in said seat, a jam-ring adapted to be screwed onto the threaded ends of said main body portions to hold said packing-ring in place, and a removable plug arranged in the opposite side of said coupling, substantially as described.

4. A pipe-joint of the character described comprising a main or body portion having at each end right-angularly-formed portions which project in planes at right angles to each other, said portions being bent or curved so that the outer ends thereof project in planes at right angles to said portions, exterior screw-threads formed on said right-angularly-bent ends, annular flanges formed on said ends at a suitable distance from said threads, coupling-heads arranged on said threaded ends, said heads comprising a cylindrical body portion having formed in one side a circular opening to receive said threaded ends of the main or body portion, an annular flange formed on the inner side of said coupling-head adjacent to and concentric with the opening therein to form a packing-ring seat, a packing-ring arranged in said seat around the projecting end of said main body portion, a jam-ring adapted to be screwed onto the threaded end of the latter, a washer arranged between said jam-ring and packing-ring, a set-screw adapted to be screwed through alined openings in the threaded end of said main or body portion and in said jam-ring to hold the latter in place, a screw plug or cap adapted to be screwed into a threaded opening in the opposite side wall of said coupling-head, and an interiorly-threaded, laterally-projecting socket to receive the threaded ends of pipes connected to said joint, substantially as described.

In testimony whereof I have hereunto set my hand in presence of two subscribing witnesses.

ROGER ENRIGHT.

Witnesses:
FRANK E. COWAN,
SETH S. HUNTLEY.